Figure 1:
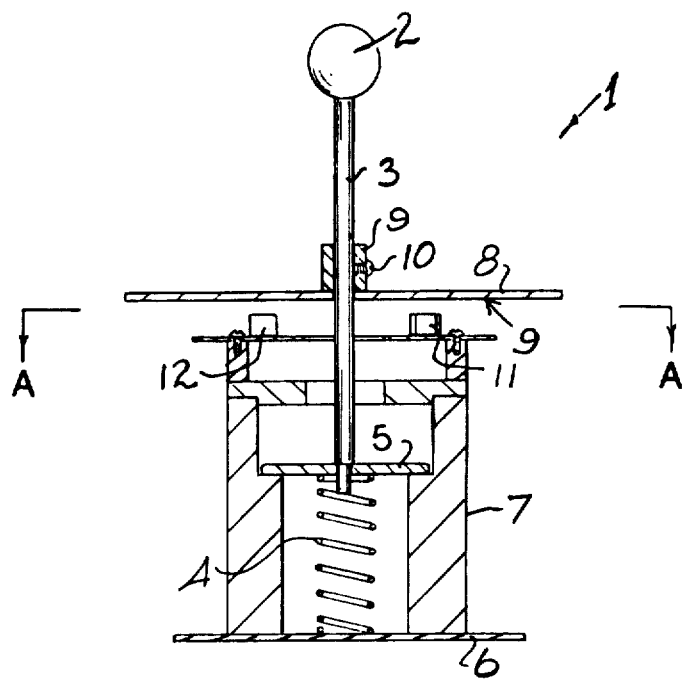

United States Patent [19]

Read

[11] 4,369,397

[45] Jan. 18, 1983

[54] MOTOR CONTROL APPARATUS FOR A MOTORIZED VEHICLE, AND METHOD THEREFOR

[76] Inventor: Graham L. Read, West Hindmarsh, Australia

[21] Appl. No.: 60,356

[22] Filed: Jul. 25, 1979

[30] Foreign Application Priority Data

Jul. 28, 1978 [AU] Australia ............................ PD5266

[51] Int. Cl.³ ............................................ B62D 11/04
[52] U.S. Cl. .................................... 318/54; 318/53; 318/65; 318/68; 180/6.5
[58] Field of Search ............... 318/587, 53, 54, 65, 318/68, 51, 59, 34; 180/6.5, 170, 178, 179

[56] References Cited

U.S. PATENT DOCUMENTS

| | | | |
|---|---|---|---|
| 3,351,148 | 11/1967 | Solomon | 180/6.5 |
| 3,374,845 | 3/1968 | Selwyn | 180/6.5 |
| 3,481,417 | 12/1969 | Jarret et al. | 180/6.5 |
| 3,596,154 | 7/1971 | Gurwicz et al. | 180/6.5 |
| 3,748,564 | 7/1973 | Ohba | 318/587 |
| 3,812,929 | 5/1974 | Farqué | 180/6.5 X |
| 3,814,199 | 6/1974 | Jones | 318/587 X |
| 3,870,935 | 3/1975 | Abels et al. | 180/6.5 X |
| 3,934,181 | 1/1976 | Rosenthal | 318/53 |
| 4,059,786 | 11/1977 | Jones et al. | 180/6.5 X |
| 4,119,164 | 10/1978 | Fogg, Jr. et al. | 180/6.5 |

*Primary Examiner*—B. Dobeck
*Attorney, Agent, or Firm*—McAulay, Fields, Fisher, Goldstein & Nissen

[57] ABSTRACT

A control arrangement for manually controlling speed and direction of devices such as electric motors typically where these drive the two driving wheels of a wheel chair, the control being achieved by having the radiant energy falling on several detectors, these being responsive to radiant energy falling on them from an emitter and this being controlled by the position of a reflective surface which is coupled to a control arm, the outputs from each detector being compared electronically both to determine whether the motor or motors should drive in a forward or rearward direction and their speed.

12 Claims, 6 Drawing Figures

MOTOR CONTROL APPARATUS FOR A MOTORIZED VEHICLE, AND METHOD THEREFOR

This invention relates to an improved control apparatus and method of control having particular advantage in relation to the control of electric drive motors and in an application such as wheel chairs where there are two electric drive motors each driving one wheel of the wheel chair.

BACKGROUND OF THE INVENTION

In a most general sense most wheel chairs driven by electric motors are presently being controlled by a control device which has a manually operable control stick and this is connected to a number of switches to control the direction of drive of each of the motors and variable resistors by which the speed of the motors in either a forward or rearward direction can be effected.

In practice, the resistors deteriorate very quickly because of constant wear of wipers on resistance material and even with the highest quality materials such rapid wear is experienced.

Furthermore, contacts in switches also deteriorate in the constant use situation applicable in such applications as wheel chairs, and it has been experienced that such units need constant and indeed expensive replacement.

Applicant is aware of attempts to overcome this problem in such cases as that illustrated in U.S. Pat. No. 3,814,199 in which a mask is used to control the amount of light falling onto a detector from an emitter located on the other side of the mask.

No practical application of such a concept has been seen but a number of difficulties do result from such a proposal.

For instance, an off condition of any motor is established by the mask fully stopping light falling onto a particular detector but at the same time, the detector must be sensitive enough to commence drive of the respective motor upon a very small additional light falling on the detector.

The motor control speed is governed by varying the degree of light falling on the detector and the full range of motor speeds therefore must be able to be obtained by varying the light by covering a selected portion of the detector.

This means of course that very small differences in position of a mask must result in significant changes in motor speed, and therefore the device becomes very sensitive to even slight vibration or to manufacturing tolerances and also of course any spurious reflections.

The device will also of course be quite sensitive to the voltage supplied to the light or radiant energy emitter in that this will directly affect the motor speed if it increases or decreases and it therefore would appear not to be a clearly satisfactory answer.

Indeed it is shown in one application, especially shown in FIG. 14 of this patent, that a resort to off/on contacts for forward and rearward speed control of the motor is suggested as a preferred answer.

In another attempt to solve the same problem, applicant is aware of U.S. Pat. No. 3,934,181 in the name of Rosenthall.

This also includes a mask however with a more sophisticated attempt to provide less sensitivity in the control by providing specifically shaped cutouts in the mask but this apparatus also suffers from the same problems as those experienced in the previous apparatus and there is obviously required great skill in devising some cutout shaping to provide good control of the motor speed which can provide proportionate control of the two motors so as to ensure an accurate direction of drive of the wheel chair.

Once again, no practical application of the apparatus is known to the applicant and it is believed that it is an apparatus and incorporates circuitry which has significant difficulties still.

OBJECT OF THIS INVENTION

It is one object of this invention to propose a control arrangement for electrical motors for purposes such as those described which can be manufactured economically, and which can provide very uniform control and with appropriate circuitry provide proportional control in a manner which is better than has hitherto been available.

Another object of this invention could be said to reside in the intention to provide a control arrangement which can be manufactured in such a way that tolerances of various components is not critical and furthermore that the apparatus is not highly susceptible to light leaks or deterioration of components.

In another aspect, the object of this invention relates to a control arrangement coupled with control circuitry such that drive motors can be controlled in such a way that they have better starting and torque as compared to speed characteristics than has hitherto been the case with other control circuits.

Another object of this invention is to provide an arrangement in which it is less necessary than perhaps has been hitherto necessary to provide deliberate switching by contacts at the control of the direction of each of the electric motors.

CONCEPT OF THIS INVENTION

The invention in one form can be said to reside in an arrangement for controlling apparatus such as electric motors in which there is a radiant energy transmitter and a receiver or detector which will predominantly control either a forward or rearward proportional speed of that electric motor or other device, the arrangement being characterised in that the outputs of the detectors are compared electrically and the joint result is used to control the motor speed and also to determine the forward and rearward direction.

In other words, rather than try to blank off one detector while the other is being used, fully control the respective direction of the motor, both detectors are being energised, but the output is handled by the electronic circuitry which is used to monitor both of the outputs of the detectors and in fact in the circuitry preferred, each of the outputs is converted into a proportional pulse length and the difference between their respective pulse lengths is used to determine the appropriate speed of the electric motor.

For wheel chair applications, it is of course conventional to use two electric motors and to proportionately drive these to effect any turning.

Accordingly, it is preferred that there are four detectors arranged symmetrically so that two of the detectors control one of the motors, that is in respect of its forward and rearward speed and direction and the other two affect the other motor both in respect of its forward or rearward direction and speed.

By using the comparison between the respective detectors and electronically comparing the outputs, it becomes possible very simply to detect an equality of output so that a stop position for the motor can be easily established without the need to establish this in some mechanical way with the mechanical apparatus with its necessary problems associated with tolerances.

There are of course inherent problems with the masks because they require specific shaping and they are subject to problems of installation and tolerances and it is therefore a significant proposal to provide that each of the detectors has an adjoining emitter of the sensitive radiant energy and the detector is arranged to respond to reflected radiant energy from its adjoining transmitter.

The relative position of the reflection member which is termed the shift member can then control the relative outputs of the respective detectors and of course this in its simplest form need only be a straight plate and provided the detectors are appropriately separate, one from the other there will be negligible interference one with respect to the other so that the mechanical side of the apparatus can be made very simple indeed.

There are of course in the widest concept many differing ways in which detectors and adjoining transmitters of radiant energy which would normally be light being located in a symmetrical arrangement around the shift member and such differing arrangements as locating these around the periphery of a cylindrical shift member or perhaps having a cone, the position of which is varied either by raising or lowering or displacing side to side could also be used for more exotic answers.

From a point of view of simplicity of manufacture and lack of tolerance problems, a flat plate is used and the plate is retained within an encircling ring so that it is merely the shift member comprising the reflecting plate which is displaced against any portion of the circular periphery against resilient spring pressure that determines the relative outputs of the respective detectors.

It is known that a drive to an electric motor is preferred in the form of a pulse in which the voltage of the pulse ensures easy overcoming of surface resistances or contact resistances but at the same time there is sufficient energy within the pulse to cause the motor to rotate.

The pulse width control is not a new technique in relation to D.C. motor drive but using a controller such as those described or characterized requires techniques which are considered to be unique.

In relation to the quadrature arrangement of the detectors, each of the outputs of the detectors is used in a device such as a device conventionally known as a 555 I.C. to determine the length of time of a pulse which is triggered by a common trigger pulse supply which triggers at the same time a commencement of a pulse with three other similarly controlled 555 timers each being coupled to a separate detector output.

The output then is in the form of commonly commenced pulses the width of which varies in accord with the detector output and the outputs from the detectors used to be responsible in the main for the forward or rearward direction of one electric motor are compared so that the difference in pulse width is used to generate a further pulse of time equivalent to the difference in time of the two pulses and then this is used to directly generate the appropriate speed of the appropriate motor.

A simple logic comparison of the respective output pulse width from one detector as compared to the other is used to control the direction of current into the appropriate motor which in the preferred instance comprises a relay although this can be a solid state device.

Likewise, by simply not accepting pulse widths under a certain time as the resultant output from the difference comparison, there can be a very clear and easily defined null point determining the stop position of the respective electric motor.

This is achieved by simply putting a time delay after the output of the exclusive OR gate used to determine the difference in width between the respective detectors controlling one motor.

Likewise, there is an arrangement for applying a breaking force on the respective motors once again this being by logic sensing of the various states of output.

The invention could be said then to reside in a control arrangement for electrical motors, the arrangement being of a type in which a mechanical controller is adapted to be manually used to control forward or rearward direction and speed of at least one electric motor, the arrangement being characterized according to this invention and that the means to convert the manually determined position of the controller into an electrically useful signal to control the electric motor, includes a shift member controlled in position by the controller and at least two detectors, the position of the shift member being detected by the detectors by the varying effect on the detectors in any of the selected range of position of the shift member, the output from each detector being in the form of an electrical signal and being varied by reason of such varied relative position of the shift member in respect of the several detectors, and an electrical circuit controlling the electric motor or motors which circuit is arranged to effect a drive signal for the electric motor or motors which is varied to control a speed of the motor or motors as a factor of the combination of outputs of at least two of the detectors.

The invention could reside in the further feature that there are four detectors and in fact two electric motors, the detectors being arranged symmetrically relative to a centre of range of position of the shift member and the detectors being coupled to be predominantly responsible for in sequence, forward left, forward right, rearward right and rearward left movement of the appropriate electric motors.

Preferably there is the further feature that each detector has adjoining it a radiant energy emitter and the detector is adapted to respond with a proportional electrical output to the level of radiant energy from the emitter reflected from a surface of the shift member.

Further, preferably, the shift member includes a planar reflection surface which is held in position against manual deflection by resilient pressure.

Further preferably, each detector is coupled to electronic means effective to provide a train of pulses, the time of each pulse being controlled by the level of reflected radiant energy received by the respective detector.

Further preferably, the electronic means include means to determine a relative length of a pulse resulting from a detector predominantly responsible for a forward and predominantly responsible for a rearward direction of an electric motor and to effect thereby a connection to the respective motor to determine the speed of the respective motor.

Figure 2:
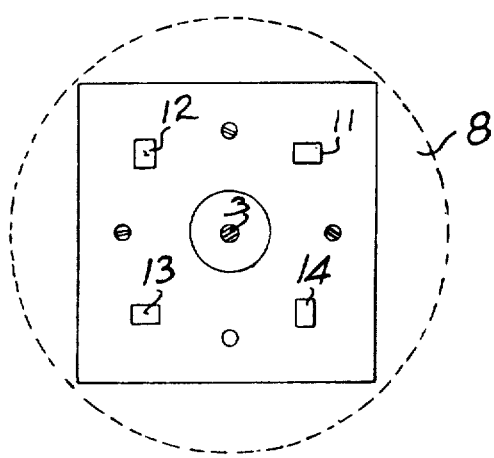
Figure 3:
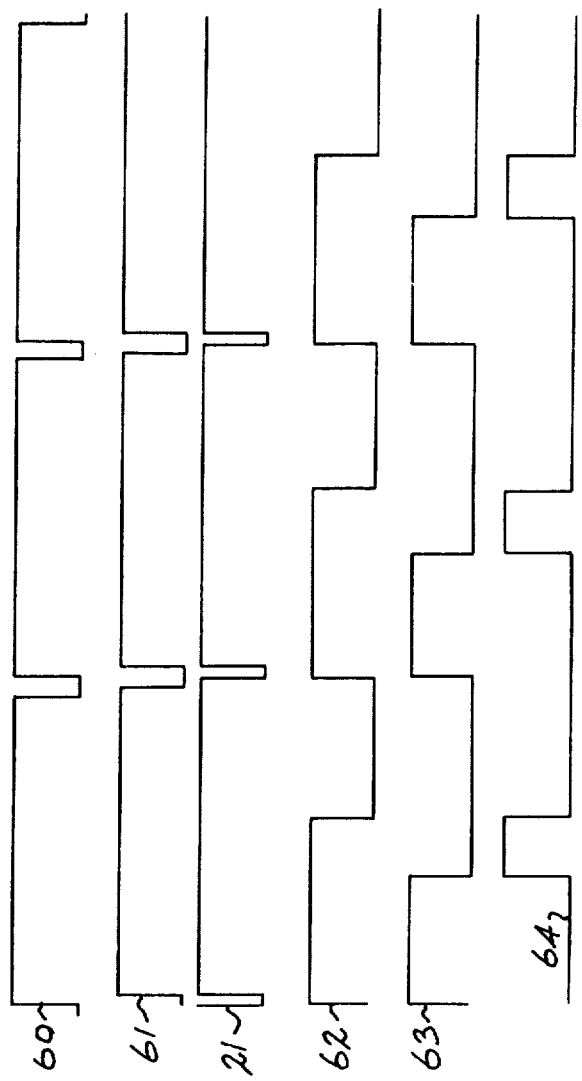
Figure 4:
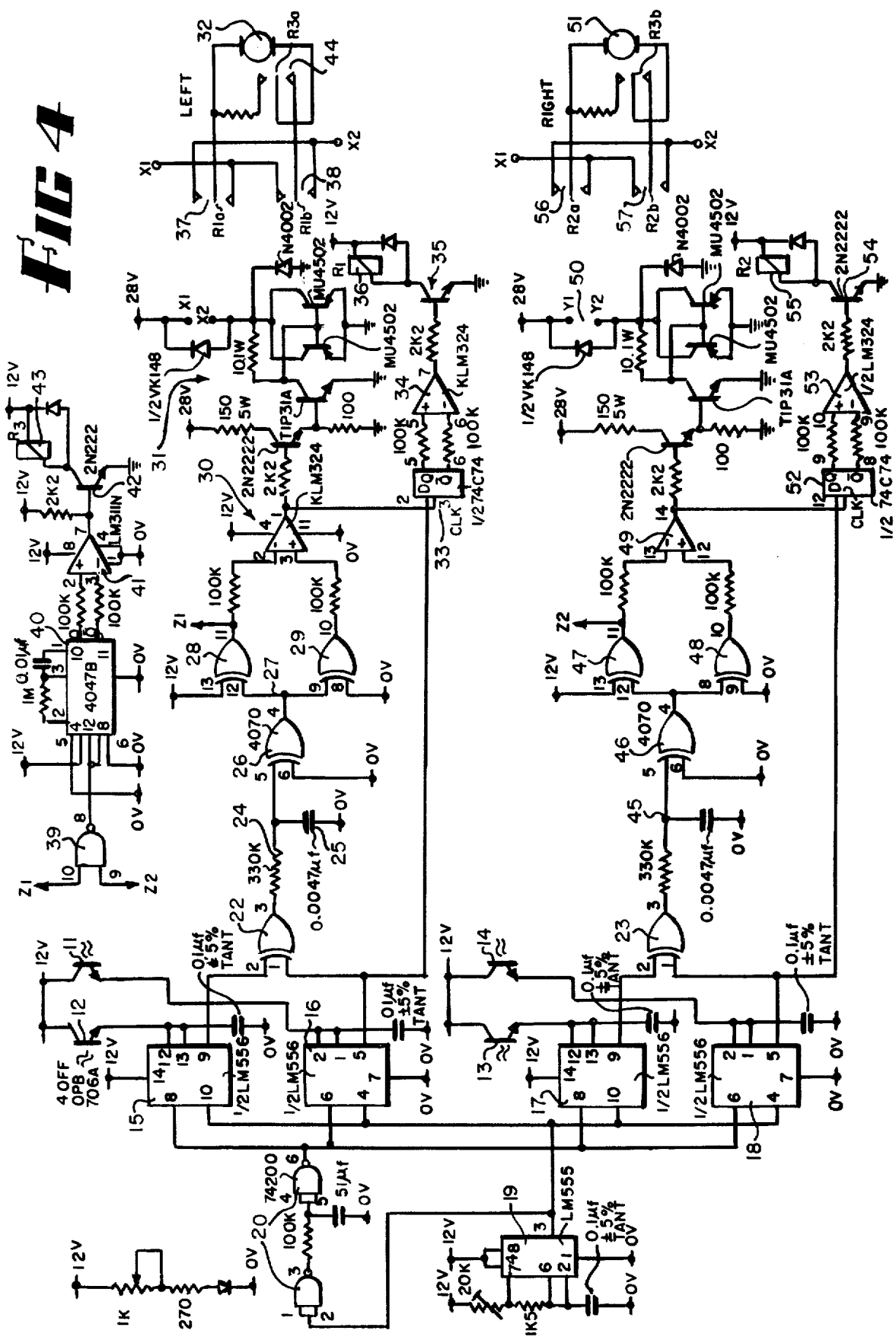
Figure 5:
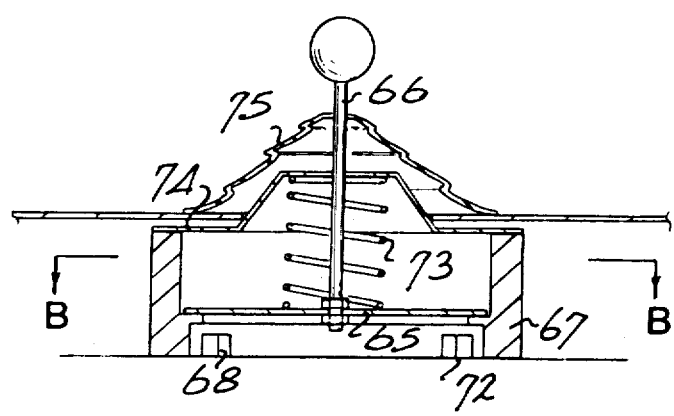
Figure 6:
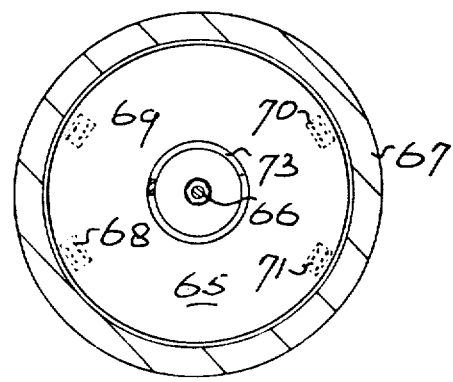

Assistance in an understanding of this invention and also a description of the preferred method of performance will now be given with the assistance of drawings in which;

FIG. 1 is a cross sectional view of a control arrangement showing the mechanical arrangement of a manual control stick held under resilient pressure and two detectors positioned below a shift member including a lower planar reflective surface, FIG. 2 is a cross section along the plane A—A in FIG. 1 showing specifically the layout of the four detectors, FIG. 3 is a series of voltage versus time graphs showing typical outputs at various stages of the circuitry, FIG. 4 shows in detail the circuit arrangement, FIG. 5 is a cross sectional view of a mechanical controller according to a second embodiment and FIG. 6 is a cross sectional view along the plane B—B in FIG. 5.

Referring to the drawings in detail and especially to FIGS. 1 and 2, this comprises a manual controller 1 which includes a body 2 which is of circular cross section.

The body 2 includes a control number 3 which can be termed a joy stick which is held in position by helical spring 4 attached to deflection member 5 and a base plate 6 so as to provide a resilient pull between the two.

The deflection member 5 is also a planar member retained within a circular ring 7 so that if the joy stick 3 is pushed to a side, this will have the effect of causing the deflection member 5 to pivot around one edge and lift on the other which will have the effect of causing a somewhat similar but accentuated movement of the shift member 8.

The shift member 8 is attached in adjustable manner by boss 9 and adjustable screw 10 to the shaft of the joy stick 3 but perhaps more importantly the shift member 8 has an underneath planar surface 9 which acts as a reflective surface.

There are four combined radiation detection and emitting units 11, 12, 13 and 14.

These are each in the preferred instance a device which combined a light emitting diode directed to emit radiant energy in the form of visible light in an upward direction and a detector is arranged to detect the reflection from this by way of a photosensitive transistor circuit.

Such devices are available commercially and the type used in the preferred application is known as O.P.B. 706A.

The four emitters and detectors, the emitters of course being adjoining the respective detectors and essentially are within the same package comprising the device, are arranged in symmetrical manner around the central manual control member 3 and the devices are respectively arranged and coupled into an electrical circuit so that each detector has its output responsible predominantly for either respectively the forward or rearward direction of one or other of the electric motors being intended to be controlled by the apparatus.

The result of the arrangement shown is therefore that in the rest position as the drawings show, the distance of the reflective surface 9 of the shift member 8 will be substantially the same in respect of all four detectors and therefore the outputs will be all very closely similar and by reason of the arrangement of the electronic circuitry which will be now described, the result will be such that neither of the motors will be effectively driven.

However, by even the slightest diverson, the difference in output of the respective detectors will be varied and by reason of comparison of these, the motors will be driven accordingly.

Now referring to the electronic circuitry as shown specifically in FIG. 4 and which shall be described in conjunction with some of the outputs as shown in FIG. 3 the detectors now shown as 11, 12, 13 and 14 in FIG. 4 are coupled in each case into the appropriate portions of a 555 timer 15, 16, 17 and 18 these of course being shown as a package LM 556 which comprises two 555 timers in the same package.

Each of the timers, 15, 16, 17 and 18 are triggered at the same time by a trigger pulse generated by timer 19 the output which is fed both directly into the timers 15, 16, 17 and 18 and also by way of the delay circuitry 20 so that a trigger pulse as shown in FIG. 3 at 21 is the result.

This is therefore effective to provide a common trigger pulse into each of the timers 15, 16, 17 and 18 with the result that there is a train of pulses emanating from each of the timers 15, 16, 17 and 18 the length of which is governed by the respective outputs of the detectors 11, 12, 13 and 14.

The outputs of the pulses are fed into the respective inputs of an exclusive OR gate 22 in the case of 11 and 12 and 23 in the case of 13 and 14.

This will have the effect of comparing the respective lengths of the pulses coming from the timers and the output from this will be in fact a pulse, the time of which will be the difference between the time of the respective pulses emanating either from 15 and 16 or 17 and 18.

The output from the exclusive OR gate 22 is fed through a delay circuit specifically resistor 24 and capacitor 25 so that if the pulse does not continue for a sufficient time, the necessary input voltage to fire the following exclusive OR gate 26 will not be reached and there is therefore no output into line 27 unless the length of pulse is of a specified minimum time.

This of course means that slight differences from the detectors will be ignored resulting in no output and there is therefore a quite high tolerance in respect of the null or centre no-go position in respect of the motors.

It is quite important that the actual switching time in respect of any pulse, be as quickly as possible and the output fed into line 27 is therefore fed jointly into two exclusive OR gates 28 and 29 the outputs of which are jointly fed into the differential inputs of the operational amplifier 30 so as to give as much positive and as rapid a switching rate as possible and the resultant pulse is then transferred to amplified circuitry 31 to feed via contacts X1 and X2 into the motor 32.

To detect whether the motor should be driven in a forward or rearward direction, the output from timer 16 is compared in a flip-flop circuit 33 to the actual output from the operational amplifier 30 so that if the pulse is actually of a shorter time than the actual pulse resulting through the operational amplifier, this means that it is intended that a forward direction be selected and appropriately then, the operational amplifier 34 drives through amplifier circuitry 35 to drive relay coil 36 which will appropriately control contacts 37 and 38 in respect of the motor direction.

Relay contacts 37 and 38 normally connect motor 32 to be driven in a reverse direction when the pulse output from timer 16 is longer than the pulse from the operational amplifier 30 so that relay 36 is deenergized or in its position for reverse drive of motor 32. When relay 36 is energized, contacts 37 and 38 are actuated to reverse the current flow to motor 32 and thereby reverse the direction of rotation of motor 32 because the pulse from operational amplifier 30 is longer than the pulse from timer 16 whereby to render amplifier 34 conductive so as to energize relay 36.

It is sometimes considered very important that when there is no positive drive, the D.C. motors should be shorted so that these in fact will act as a brake.

Accordingly, an output from exclusive OR gate 28 referred to as Z1 is fed into NAND gate 39 which in turn is accepted into free running oscillator with reversing outputs 40 such that so long as a pulse exists which is of a longer time than that inherently determined by the 1 meg. resistor and the 0.01 micro-farad condenser then there will be a positive output into the operational amplifier 41 which in turn when rendered operative energizes normally deenergized relay coil 43 which will when rendered conductive in response to amplifier 41 being conductive hold the relay coil 43 effective so as to hold the relay contacts 44 in an open position. Contacts 44 are in their closed position when relay coil 43 is deenergized.

The description has been given generally in respect of timers 15 and 16 but of course the timers 17 and 18 as previously described, feed into also an exclusive OR gate 23 and the circuit is the same so that in the delay circuit 45 the output is cut off if of not of a minimum length of time but if there is a minimum length of pulse time exceeded then exclusive OR gate 46 is fed into the differentially arranged exclusive OR gate 47 and 48 which then rapidly turns operational amplifier 49 to give either a positive or negative output which output is amplified and fed via contacts Y1 and Y2 shown at 50 into the motor 51.

The flip-flop 52 likewise controls the forward or rearward direction connection of motor 51 by way of the operational amplifier 53 the amplifier 54 operating through coil 55 which in turn affects the contacts 56 and 57.

The results of the circuit can be also followed by reference to the pulse diagrams of FIG. 3 in which graph 60 is the free running clock output of the timer 19 as might be typically shown 61 is the output when passed through the delay circuitry 20 and the resultant trigger circuit is that as shown in 21.

The output from the respective timers, for instance 15 might be as shown at 62, and 16 is that as shown at 63 and of course, the resultant output from the exclusive OR gate 22 will then be that as shown at 64.

It will be seen therefore that all of the timers 15, 16, 17 and 18 are in synchronism and are being constantly reset and of course the outputs are being compared and in fact being subtracted one from the other to provide the actual pulse driving the respective motors.

Also the electrical outputs are compared to determine the forward or rearward direction of the motors.

In FIGS. 5 and 6, there is shown an even simpler second embodiment of the manual controller or control arrangement. In this case, the shift member 65 not being in an adjustable position with respect to the manual controller arm 66 but sitting within a circular well as defined by the body 67 which is of circular cross section, and there are four emitter detectors 68, 69, 70 and 71 which are secured to a base plate 72 and these are symmetrically arranged about a mid-axial position of the expected range of positions of the shift member 65.

The shift member 65 is retained in position under the resilient pressure of helical spring 73 which is held in position by cover plate 74 and dust cover 75.

Once again therefore, it will be seen how simple this arrangement is and how lacking in any difficult tolerances for manufacturing the arrangement can be.

I claim:

1. A control arrangement for electric motors in which a mechanical controller is adapted to be manually used to control both forward and rearward speed of at least one electric motor, said control arrangement comprising:
   means to convert a manually determined position of a controller into an electrically useful signal to control said at least one electric motor, said means including a shift member having various positions and controlled in position by the said controller;
   at least two detectors and a radiant energy emitter associated with each of said detectors, said detectors each being responsive with a proportional electrical output to the level of the radiant energy from the associated emitter reflected from a reflection surface of said shift member, the position of said shift member being detected by said detectors by providing a varying effect to which said detectors are sensitive and will provide a variable output therby, the electrical output signal from each said detector being varied by reason of the varied, relative positions of said shift member with respect to said detectors; and
   an electrical circuit for controlling the said at least one electric motor, and said electrical circuit including means to effect a drive signal for said at least one electric motor which is varied to control the speed thereof as a factor of the combination of outputs of said detectors to control both the direction of rotation of the controlled motor in both a forward and rearward direction and the speed thereof.

2. A control arrangement as in claim 1 wherein said at least two detectors includes four of said detectors and wherein said at least one electric motor includes two of said electric motors, said detectors being symmetrically positioned relative to a central range of positions of said shift member, and two of said detectors being coupled in said electrical circuit for predominant control of the speed of only one of said electric motors and the direction of rotation thereof in either a forward or rearward direction so that said four detectors effectively control the forward and rearward speed of both of said electric motors.

3. For an electrically driven wheelchair, a control arrangement for electric drive motors where the wheelchair is of a type including two motors, one driving independently each of two driving wheels of the wheelchair, each electric motor being controllable in speed in both forward and rearward directions whereby to control the direction and speed of the wheelchair, said control arrangement comprising:
   a shift member having a reflection surface;
   four detectors arranged in a symmetrical manner relative to a central position relative to selective range of the reflection surface of said shift member;
   a radiant energy emitter adjoining each said detector, said detector being responsive with a proportional electrical output to the level of radiant energy from the emitter reflected from the reflection surface, the output from each said detector being varied by reason of the varied relative positions of said shift member with respect to said detectors; and electrical circuit means, said detectors being coupled to said electrical circuit means such that each is predominantly determining a drive quadrant and speed direction, the outputs from said detectors which are oppositely located being combined so that the difference between the outputs is used to determine and control both the speed and direction of rotation of the respective drive motor depending upon the position of said shift member relative to said detectors.

4. A motor control apparatus for controlling both the direction and speed of a motor, said control comprising:

a universally mounted manual control member;

a shift member connected to said control member and disposed for pivotal movement between a neutral position and a displaced position upon movement of said control member;

a first detector mounted on said apparatus in a first position relative to said control member;

a second detector mounted on said apparatus in a second position relative to said control member, said second position being opposite in direction to said first position;

each of said first and second detectors being equally spaced from said shift member when said shift member is in its neutral position;

each of said first and second detectors having detection means to determine the spacing of each associated detector from said shift member and to generate an electrical output signal representative of said spacing; and electrical circuit means responsive to the outputs of said detection means for combining said output signals and for producing a drive signal for said motor, wherein said motor is stationary when said shift member is in its neutral position and said motor is operated either in a forward or rearward direction and at a variable speed depending upon the displaced position of said shift member relative to said detectors.

5. A motor control apparatus as claimed in claim 4 further for controlling both the direction and speed of a second motor, said control comprising a third detector and a fourth detector each mounted on said apparatus in respective positions opposite to one another relative to said control member; each of said third and fourth detectors having detection means to determine the spacing of said associated detector from said shift member and generating an electrical output signal representative of said spacing; said electrical circuit means responsive to the outputs of said detection means for combining said output signals of said third and fourth detectors and for producing a drive signal for the second motor; said first, second, third and fourth detectors being arranged symmetrically relative to a central range of positions of said shift member; said first and second detectors and said third and fourth detectors being electrically coupled in pairs in said circuit means; the output signals from the detectors in each pair being combined to provide a controlling signal both in terms of speed and direction for each of the respective motors.

6. A control motor apparatus as recited in claim 5 wherein said shift member has a reflection surface; said control apparatus further comprising a radiant energy emitter adjoining each said detector and emitting radiant energy in the direction toward the reflection surface of said shift member; and each said detector being responsive with a proportional electrical output to the level of radiant energy emitted from its adjoining emitter and reflected from the reflection surface of said shift member.

7. A motor control apparatus as claimed in claim 4 for controlling both the direction and speed of at least two motors for use in a motorized vehicle having a pair of driving wheels, each of said wheels being driven by a separate one of said motors; said control additionally comprising:

a first pair of said first and second detectors adapted to generate a combined electrical output signal to control one of said motors and a second pair of said first and second detectors adapted to generate a combined electrical output signal to control another one of said motors, the detectors in each of said first and second pairs of detectors being positioned opposite to one another relative to said control member;

the detectors of said pairs of detectors being arranged symmetrically relative to a central range of positions of said shift member, and being equally spaced from said shift member when said shift member is in its said neutral position;

a radiant energy emitter adjoining each said detector of said pairs of detectors and emitting radiant energy in the direction toward said shift member for reflection therefrom from a reflection surface thereof;

each said detector being responsive with a proportional electrical output signal to the level of radiant energy emitted from its adjoining emitter and reflected from the reflection surface of said shift member; and said electrical circuit means including means for combining the electrical output signals from the detectors in each pair of said pairs of detectors to produce said drive signal for controlling both the direction and speed of the associated one of said motors to control the resultant direction and speed of said vehicle, wherein said motors are retained stationary when said shift member is in its neutral position and said motors are operated either in a forward or rearward direction and at a variable speed depending upon the displaced position of the reflection surface of said shift member relative to said detectors.

8. A motor control apparatus as claimed in claim 7 wherein said electrical circuit means includes pulse generating means responsive to the output signal from each of said detectors to produce a train of pulses, the duration of each pulse being controlled by the level of reflected radiant energy received by the respective detector; said electrical circuit means further including means to determine the relative widths of the pulses from the detectors in each pair of said pairs of detectors and to produce said combined drive signal for controlling the direction and speed of the respective motor; and wherein the width of the pulse generated by the output signal from one of the detectors in said pair of said detectors predominantly responsible for producing a signal to drive the respective motor in a forward direction is subtracted from the width of the pulse generated by the output signal from the other detector in said pair of detectors predominantly responsible for producing a signal to drive said motor in a rearward direction, the difference in width of the two respective pulses producting a signal to selectively drive said motor in either a forward or rearward direction dependant upon which of said pulses is of greater duration.

9. A method of controlling both the direction and speed of at least two motors used to drive a motorized vehicle having a pair of driving wheels, wherein each of said wheels is driven by a separate motor, and which method uses a pair of radiant energy emitters and detectors for each motor spaced from a pivotally mounted shift member operated by a universally mounted control member, and which shift member has a reflection surface disposed for movement between a neutral position and a displaced position, whereby the detectors in each of said pair of detectors generate signals which are combined to generate a drive signal to control the speed and direction of the associated motor; said method comprising:

positioning said detectors, and their adjoining emitters, symmetrically relative to a central range of positions of said shift member, said detectors and emitters being equally spaced from said shift member when said shift member is in its neutral position, and the detectors in each of said pair of detectors being positioned opposite to one another relative to said control member;

emitting radiant energy from said emitters in the direction toward the reflection surface of said shift member;

detecting the reflected radiant energy of each emitter by its adjoining detector;

generating an electrical output signal from each detector representative of the level of radiant energy emitted from its adjoining emitter and reflected from the reflection surface of said shift member; and combining the electrical output signals from the detectors in each pair of said pairs of detectors and producing a drive signal for controlling the direction and speed of the associated one of said motors to control the direction and speed of said vehicle, wherein said motors are stationary when said shift member is in its neutral position and said motors are operated either in a forward or rearward direction and at a variable speed depending upon the displaced position of said shift member relative to said detectors.

10. For an electrically driven wheelchair, a control arrangement for electric drive motors where the wheelchair is of a type including two motors, one driving independently each of two driving wheels of the wheelchair, each electric motor being controllable in speed in both forward and rearward directions whereby to control the direction and speed of the wheelchair, said control arrangement comprising:

a shift member having a reflection surface;

four detectors arranged in a symmetrical manner relative to a central position relative to selective range of the reflection surface of said shift member;

a radiant energy emitter adjoining each said detector, said detector being responsive with a proportional electrical output to the level of radiant energy from the emitter reflected from the reflection surface;

electrical circuit means including pulse generating means responsive to the output signal from each of said detectors to produce a train of pulses, the duration of each pulse being controlled by the level of reflected radiant energy received by the respective detector, said detectors being coupled to said electrical circuit means such that each is predominantly determining a drive quadrant and speed direction, the outputs from said detectors which are oppositely located being combined so that the difference between the outputs is used to determine and control both the speed and direction of rotation of the respective drive motor.

11. A control arrangement as in claim 10 in which the train of pulses emanating from the electrical circuit means responding to the detector predominantly responsible for a forward direction of one of said motors is subtracted from the length of pulse emanating from the detector predominantly responsible for the control of the speed of the same said electric motor in a rearward direction, the difference in the two respective pulses being used to drive the motor in the selected either forward or rearward drive direction dependant upon which of the pulses is of a greater time.

12. A control arrangement as in claim 10, wherein said electrical circuit means includes means to determine a relative length of a pulse from said detectors for detecting a forward and a rearward movement and to effect thereby a connection to the respective motor to determine the speed of the respective motor.

* * * * *